CHROMIUM-SILICON MONOXIDE FILM RESISTORS

Filed March 30, 1967

INVENTORS
REINHARD GLANG
RICHARD A. HOLMWOOD
LEON I. MAISSEL
JEAN VERGNOLLE

BY Sughrue, Rothwell, Mion, Zinn & Macpeak
ATTORNEYS

United States Patent Office 3,652,750
Patented Mar. 28, 1972

3,652,750
CHROMIUM-SILICON MONOXIDE FILM RESISTORS

Reinhard Glang, 13 Horizon Hill Drive 12603; Richard A. Holmwood, Haviland Road, Cedar Apartments 12601; and Leon I. Maissel, 6 Vincent Road, R.D. 2 12603, all of Poughkeepsie, N.Y.; and Jean Vergnolle, 46 Route de Croissy, 78 Le Vesinet, France Filed Mar. 30, 1967, Ser. No. 627,173
Int. Cl. B28b *11/16*; B44d *11/18*
U.S. Cl. 264—67 17 Claims

ABSTRACT OF THE DISCLOSURE

A chromium-silicon monoxide film resistor produced by admixing chromium and silicon monoxide in a predetermined atomic ratio ranging from 90:10 to 50:50 in powder form, admixing with a binder, heating and forming into pellets. These pellets are then caused to evaporate at high temperatures resulting in highly accurate compositional film deposits of chromium-silicon monoxide.

BACKGROUND OF THE INVENTION

(1) Field of the invention

This invention relates to cermet film resistors made of chromium and silicon monoxide deposited as thin film resistors on a substrate. More specifically, this invention relates to the process of evaporating chromium-silicon monoxide pellets with fixed composition and depositing said vaporized material as a thin film resistor.

Thin films resulting from the simultaneous deposition of chromium and silicon monoxide are of considerable interest for application as thin film resistors. Their principal advantages are low temperature coefficients of resistance and their sheet resistance range is much greater than generally available from metal or alloy films. It is a charactristic of such metal-insulator films or cermets to decrease in resistance when heated above their deposition temperature under non-oxidizing conditions. The resistance decrease can be substantial and depends on the SiO concentration in the film. Since a post-deposition heat treatment is necessary to prepare cermet films of good electrical stability, the films' resistance after such an annealing step must be predictable within narrow limits. Control of the film composition is an essential prerequisite for a practical resistor process. However, processes which have been employed heretofore have not satisfied this requirement.

(2) Description of the prior art

In the prior art, cement films have been prepared by evaporation of chromium and silicon monoxide from two independent sources. The film composition was calculated from the individual evaporation rates of the chromium and silicon monoxide respectively and then controlled separately by ion gauge monitors. In another method, such chromium and silicon monoxide sources were spaced some distance apart and the vapors were caused to condense at different points on the substrate plane. Using the shadowing effect of mask edges, the thickness of the pure Cr and SiO films could be measured and hence the volume fractions in the composite films could be calculated. These methods, however, are not as exacting as is necessary and too much experimental variation and consequent control problems are associated therewith.

In view of the complexity and the control problems associated with such two source systems, flash evaporation of premixed powders has generally been the preferred method. Along these lines, there have been employed various feeder devices to produce a uniform flow of cermet powder to the evaporation filament. Bu tthis technique, too, lacks process control, as indicated by initial film resistance variations between 120 and 150% of the target values.

In order to compensate for these differences, a sample resistor on each substrate has been monitored during annealing and the duration of the treatment adjusted accordingly. While such individually monitored substrate annealing can correct some of the resistivity variations, the technique has severe limitations. The room temperature resistance deviates from the monitor value on account of the TCR (temperature coefficient of resistance) which in turn varies from deposition to deposition as a result of fluctuations in film composition. Hence the degree of control of the final resistor values is limited and furthermore, contacting of sample resistors during annealing and the duration of the treatment adjusted acresistor size.

A variation of this second method employed by the inventors with a different type of feeder device consisted of a variable speed rotating disc and a stationary wiper blade. Although the powder in this process does not become compressed as in some prior art appaartus, sticking in the guiding chute of the feeder device leads to agglomeration and thus non-uniform flow. While this can be avoided by intense chute vibration, this mode of operation yielded films whose properties were even less predictable than without vibrations. The reproducibility of films produced by this method was so extremely poor and the film compositions varied so greatly that this method too had to be abandoned.

SUMMARY OF THE INVENTION

In view of these considerations and problems prevalent with the prior art, applicants devised the concept of preparing pellets of chromium-silicon monoxide mixtures which have predetermined compositional ranges and are prepared in a manner to be described in greater detail hereafter.

It is therefore a purpose of this invention to produce cermet film resistors by flash evaporation of a mixture of chromium and silicon monoxide in premixed and sintered pellet form with strict compositional control of the desired weight ratio in the pellet. Through the flash evaporation of these pellets a sheet resistance reproducible within ±3% can be achieved in the range of from 10 to 30 atomic percent of silicon monoxide.

BRIEF DESCRIPTION OF THE DRAWINGS

The purpose of this invention can better be appreciated by the following description and FIGS. 1–3 which should be view in conjunction with the further description in order to gain a clear understanding of this invention.

DESCRIPTION OF THE PREFERRED EMBODIMENTS

Figures 1, 2:
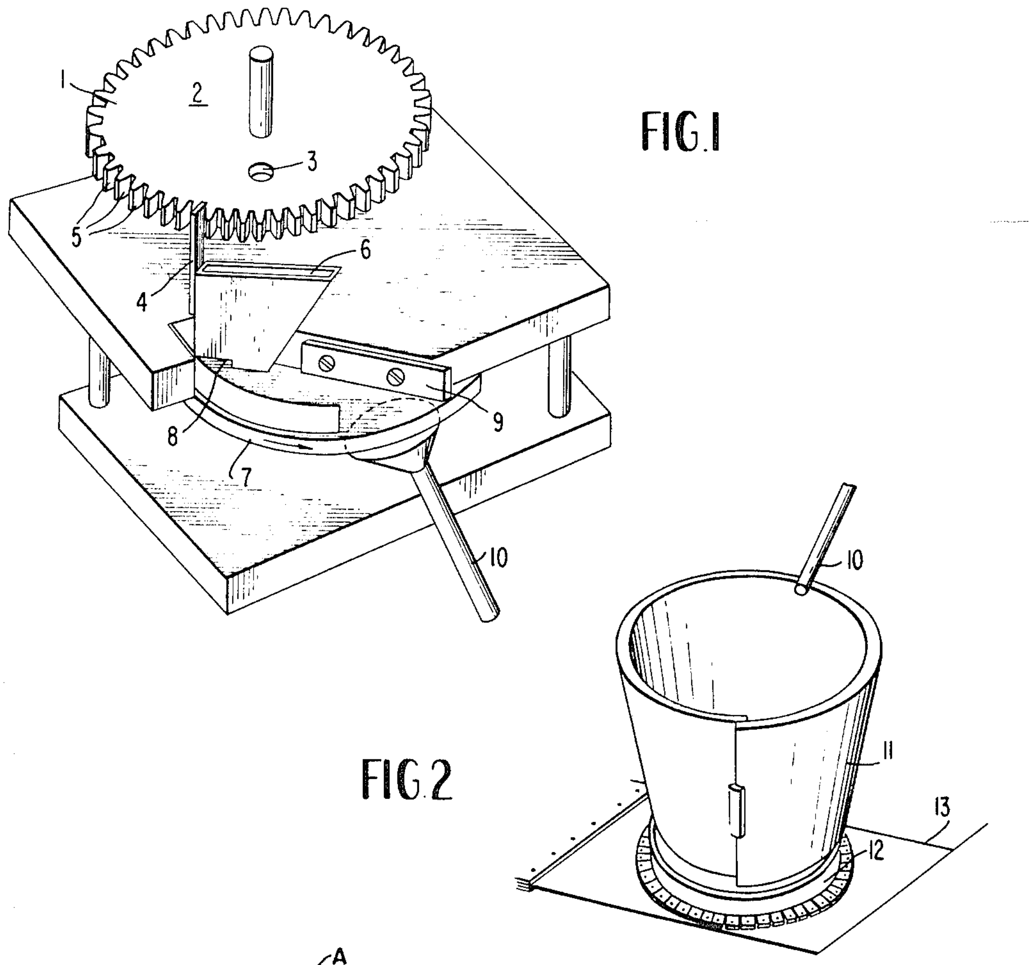
In FIG. 1, there is shown a pellet feeder in perspective to show the manner in which the pellets are introduced into the process.
In FIG. 2, there is shown again in perspective an evaporation filament together with the necessary structural features for the pellets to be fed to the said filament.

The invention in brief consists of two operations. First, the pellet preparation which consists of combining predetermined powder weights of chromium and silicon monoxide and making the sintered pellets therefrom and secondly, the actual process of pellet evaporation so as to result in the unique control of the film resistor composition of this invention.

In order to prepare compact pellets a convenient amount of chromium and silicon monoxide powders are combined in the desired weight ratio. A viscous paint is formed from said powders by the addition of organic solvents, a commercial resin binder, a plasticizer and a wetting agent. This mixture is then homogenized by ball milling. It is important that the paint have a proper viscosity for casting and, therefore, evaporation losses after mixing should be kept to a minimum by enclosure in a sealed jar. Cermet sheets are prepared from the paint with a commercial wet film applicator and a film casting knife. The casting bed is then covered with Mylar foil to serve as a support for the cast sheet. The height of the casting knife above the bed is adjusted according to the viscosity of the paint yielding several sheets. These sheets after drying have a rubber-like consistency. The sheets may now be cut into strips of manageable size and diced into small cubes by any suitable cutting or punch type die mechanism.

The diced pellets are then loaded onto quartz trays and inserted into a quartz tube furnace. By streaming air through the furnace at an elevated temperature, the binder was removed from the pellets. This procedure eliminated all carbonaceous residue, but oxidized about 2% of the chromium unavoidably. It was possible to avoid oxidation by removing the binder in vacuum but this treatment left a residue of about 0.2% carbon in the pellets. Therefore, the air treatment was preferred since the films produced from pellets made by this process appeared to be more reproducible in regard to electrical properties.

Following the removal of the binder, the pellets were firm enough to be handled and sintered in an evacuated quartz capsule. They were thereafter sufficiently cohesive to resist abrasion in the pellet feeder. The particle size of the powders is important since a coarser grade requires sintering temperatures in excess of 1100° C. and this involves the risk of collapsing the quartz capsule.

An alternative technique for preparing Cr-SiO pellets has also been undertaken by the inventors. Here Cr and SiO powders were admixed with water and urea as a binder. Following desiccation, the resulting solid was granulated and compression molded into thin slugs. The urea binder was then completely removed without decomposition by heating in vacuum. The vacuum removal of said binder also eliminated oxidation of the Cr. The slugs were then sintered.

Although this alternative method was cleaner, it required the breaking-up of the sintered slugs and subsequent sieving to achieve irregularly shaped pellets of uniform size. This can be avoided by the use of an automatic press which preforms pellets of appropriate dimensions.

In the second part of this process, the pellets were evaporated to be condensed as films in the manner of this invention. The cermet pellets were initially dispensed by the mechanism shown in FIG. 1 and evaporated by the filament and associated structure shown in FIG. 2.

In FIG. 1 there is shown a ratchet gear 1 with a surface 2 having a pellet filling hole 3 juxtaposed right over a hopper with said hopper having a spring 4 mounted thereon so that the hopper can be caused to vibrate by means of the gear teeth 5 of the ratchet gear which revolves. The pellets after being loaded through the indicated pellet filling hole of the ratchet gear are stored in the hopper 6 to be later released to a rotating feeder disc 7 through the hopper orifice 8. By means of the wiper blade 9 the pellets are wiped off the edge of the disc 7 and caused to fall through a quartz funnel tube 10 toward the filament. The feed rate can of course be adjusted by varying the speed of the rotating disc.

Figure 3:
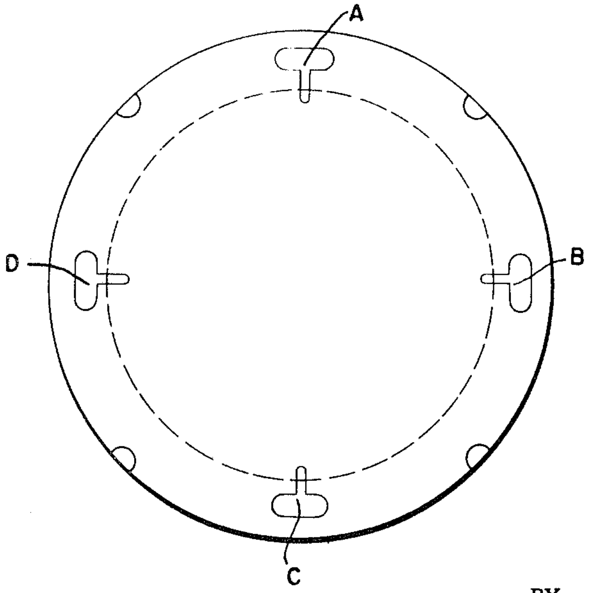
In FIG. 3, there is shown a monitor substrate with A, B, C and D designating the evaporated contact lands for monitoring purposes, while the half-circles at 45°, 135°, 225° and 315° are locating dots.

Looking now to FIG. 2, the quartz funnel tube 10 leads into the conical pellet shield 11 which in turn is juxtaposed over the tantalum chimney 12 and the tungsten filament 13 which serves as the evaporating surface. The pellets were confined to the hot center area by the tantalum chimney and the separate cone shaped deflector shown in FIG. 2 prevents the bounding pellets from escaping. The sheet resistance of the growing film is continuously measured and used as the process control parameter. The monitor substrates are similar in all respect to the regular substrates and mounted in the same way. The monitor wafer has four pre-evaporated peripheral metal film contacts. As shown in FIG. 3, each contact consists of a land area for probing and a narrow tip protruding into the circular deposition area defined by a ring mask.

Application of a constant current, I=4.53 ma. to two adjacent contacts produces a millivolt reading V across the other two contacts which is identical to the sheet resistance of the film in ohms per square according to the equation $$R_s = 4.53 \frac{V}{I}$$

The measuring current to the monitor wafer is not applied until after deposition of about 200 A. of resistor film to avoid overload damage at the contact tips. The sheet resistance of the growing film is continuously compared to the desired stop value which can be dialed into four sets of binary coded decimal switches. As soon as the measured sheet resistance and preselected stop value agree, the deposition is automatically terminated by closing the substrate shutter and discontinuing the pellet feeding.

Tests are then conducted to determine the reproducibility of the silicon to chromium ratios in the pellets and in the films that can be obtained by this method. To allow measurement of this ratio a wafer of germanium is substituted for one of the silicon substrates on which the film is to be deposited. After deposition the germanium wafer is subjected to X-ray fluorescence analysis and the silicon to chromium ratio determined. The accuracy of this analysis is estimated to be about ±1 atomic percent silicon. The technique does not discriminate between silicon species and therefore compositions are given in atomic percent silicon, the difference to 100% being chromium. Usually the chromium to silicon ratio of the pellets is maintained in the evaporated films within limits corresponding to the accuracy of the analysis. Exceptions occurred where pellets of high silicon monoxide content (40–50%) were employed, and deviations of up to ±3% were observed in these films.

With the foregoing general discussion in mind, there are given here detailed examples of the practice of this invention. These examples are given for illustration alone to bettter enable the skilled worker in the art to appreciate this invention and are not to be construed in any manner limiting this invention.

EXAMPLE I 500 grams of Cr and SiO in an 80:20 atomic ratio were combined as powders of less than 20 microns particle size. To this mixture there was added 75 g. of toluene, 50 g. ethyl alcohol, 100 g. cyclohexanone (the organic solvents), 45 g. of B–98 Butvar Resin, (a polyvinyl butyral resin binder made by Shawinigan Resins Corp.), 15.5 g. of dibutyl phthalate (a plasticizer), and 10 g. of Tergitol (a wetting or surface active agent manufactured by Union Carbide Corp.). All of these ingredients are mixed and homogenized by ball milling for nine hours.

Following this, cermet sheets are prepared from the paint-like mitxure with a commercial wet film applicator (Model AG3860) and a film casting knife (Model AG3820G, both manufactured by Gardner Laboratory Inc., Bethesda, Md.). The casting bed is covered with 0.002 inch thick Mylar foil to serve as a support for the cast sheet. The height of the casting knife above the bed is adjusted at 0.073 inch. The paint from the 500 gram batch of chromium-silicon monoxide powder yielded three sheets of about 9 x 17 inch size. Following a drying in air, the sheets were 0.025 to 0.030 inch thick and had a rubber-like consistency.

The sheets were then cut into strips of manageable size and diced into small cubes of 0.030 inch in edge dimension. The diced pellets were loaded onto quartz trays and inserted into a quartz tube furnace at room temperature. At a streaming air flow through the furnace of 3 liters per minute the temperature was raised steadily to 500° C. in a period of ninety minutes to remove the binder. The pellets were maintained at 500° C. for an additional ninety minutes to insure complete removal of the organic material. During the binder removal cycle, all carbonaceous residues were eliminated but about 2% of the chromium was unavoidably oxidized.

Following the removal of the binder, the pellets were firm enough to be handled and sintered in an evacuated quartz capsule at 1100° C. for sixteen hours, or until sufficiently cohesive to resist abrasion in the pellet feeder.

5 grams of the 80 atomic percent Cr–20 atomic percent SiO pellets were placed in the hopper. The feed rate was adjusted for about 1 gram per minute. A new tungsten filament was positioned and the conical pellet deflection shield and quartz funnel tube were aligned. Six silicon wafers whose surfaces were insulated by an $SiO_2$ film were loaded into the substrate holder together with a monitor substrate with external electrical leads so that the process could be appropriately controlled.

The substrate holder was loaded into the vacuum system and the vacuum brought down to below $5\times10^{-7}$ torr. During the pumping or evacuation operation, the substrates were heated to 200° C. and the automatic sheet resistance stop value was set to 50 ohms per square. The source was then brought up to 2050° C. The pellet feed was started and after 30 seconds the shutter was opened exposing the substrate. After 10 seconds, the current through the monitor substrate was actuated and when 50 ohm per square sheet resistance was deposited the shutter closed and the pellet feed stopped automatically. The substrates were then cooled to room temperature before removing them from the vacuum system.

The sheet resistance of the monitor wafers measured at 200° C. immediately after terminating the deposition was 49.4 ohms per square ±0.4% (lag of the shutter in closing) and rose to 49.8 ohms per square ±1% after cooling to room temperature and exposing to air (T.C.R. and surface oxidation effects).

Of the films deposited in accordance with Example 1, the average sheet resistance for 33 oxide insulated silicon wafers after a one hour anneal at 400° C. was 34.5 ohms per square or 31% below the 50 ohms per square stop value. Around this common average, the individual wafers scattered as follows: 27% of them were within ±1%; 70% of them were within ±2%, while 97% of them were within ±3%.

EXAMPLES II–IX

In the Table I there is shown other compositional ranges of Cr-SiO pellets. In each of these compositions ranging from pure Cr pellets to 50–50 atomic percent Cr-SiO, three identical deposition runs of six wafers each were made from each pellet composition. The deposition runs were performed in a similar manner as described in Example I, except that a film thickness of 1000 A. leads to different sheet resistances in accordance with the differences of film composition.

After deposition all the film samples were annealed at 400° C. for 1 hour. Since in 3 positions 6 wafers each were coated, 18 wafers per composition were produced. In the following table the maximum deviation of individual wafers from each 6 wafer run as well as from the average of all 18 wafers is shown:

TABLE I.—SCATTERING LIMITS OF CERMET FILM SHEET RESISTANCES AFTER ANNEALING

| Pellet composition (at percent SiO) | Max. sheet resistance deviations after annealing at 400° C. (percent) | | | |
|---|---|---|---|---|
| | From single run averages | | | From common average of three runs |
| | Run 1 | Run 2 | Run 3 | |
| Example II (0) | ±3.4 | ±9.5 | ±1.8 | ±9.1 |
| Example III (5) | ±5.7 | ±2.3 | ±2.1 | ±7.0 |
| Example IV (10) | ±1.0 | ±2.1 | ±2.0 | ±3.3 |
| Example V (15) | ±1.3 | ±1.2 | ±1.6 | ±2.6 |
| Example VI (25) | ±1.0 | ±1.0 | ±0.9 | ±2.9 |
| Example VII (30) | ±1.0 | ±0.9 | ±1.2 | ±3.7 |
| Example VIII (40) | ±1.5 | ±3.6 | ±3.4 | ±5.1 |
| Example IX (50) | ±4.4 | ±4.6 | ±3.5 | ±12.0 |

The scattering data for the composition interval from 10 to 30% SiO show excellent uniformity within the run and reproducibility of about ±3%. At higher SiO concentration uniformity is still fair, but the reproducibility of the post anneal values is adversely affected by small run-to-run fluctuations of the film composition. Films containing less than 10% SiO are less reproducible and not as uniform as those obtained with other compositions.

EXAMPLE X

Pellets of 80–20 atomic percent Cr–SiO compositions were prepared as in Examples I through IX, but instead of the usual oxide insulated silicon wafer, molybdenum sheets of one inch edge dimension by 0.08 inch thick were employed and coated with an insulating film of silicon monoxide. Knowing the residual resistance of 80 to 20 chromium-silicon monoxide cermet films after isothermal annealing for one hour at 400°, 500° and 600° which had previously been deposited at 200° to a sheet resistance stop value of 50 ohm per square, it was possible to predict the stop value required to produce films which would have a sheet resistance of 10 ohm per square after annealing at 450° C. for one hour. The predicted stop value of 16 ohms per square required film approximately three times the thickness of the standard 1,000 angstrom films used in Examples II through IX and thus approximately 3,000 angstrom films were employed. The monitor substrates from twelve identical cermet depositions were annealed at 450° C. for one hour and their sheet resistances were measured. Around an average value of 9.68 ohms per square, the individual substrates from different runs scattered as follows:

10% within ±1%
73% within ±2%
100% within ±3%

The results from depositions of Example X show that the stabilized sheet resistances are only 3% lower than the predicted values and could be reproduced within ±3%. This indicated that the 1:1 transfer of the pellet material into the films was not affected by the longer deposition time or increased thickness of the condensed films.

From the foregoing general description and detailed specific examples, it will be evident that this invention provides a novel and unique way for producing Cr–SiO thin film resistors resulting in excellent and unique reproducible means for producing these resistors. While the descriptions above have been illustrative and presented merely for the purpose of understanding this invention clearly, applicants wish to be solely bound by the following claims.

What is claimed is:

1. A process for producing thin film chromium-silicon monoxide resistors comprising:

(a) admixing a predetermined ratio of chromium and silicon monoxide powder at an atomic ratio of Cr:SiO within the range of from about 90:10 to about 50:50, said atomic ratio being substantially equivalent to the desired composition of said resistor film, (b) adding thereto a temporary binder which is substantially completely removable by heating and extruding the thus formed material into a thin sheet, (c) cutting said sheet into pellets, (d) heating and drying said pellets whereby said temporary binder is substantially completely removed, and sintering said pellets, (e) feeding the resulting pellets to a pellet evaporator and simultaneously evaporating a plurality of pellets by contacting a plurality of said pellets with a heated filament to produce a vapor of substantially constant composition, whereby a homogeneous, highly accurate compositional resistor film deposit of chromium-silicon monoxide on a substrate provided in said pellet evaporator results.

2. A process as in claim 1 wherein the formed pellets are fed to a pellet feeder and sequentially passed into contact with a tungsten filament evaporating surface having thereon appropriate substrates for coating with a thin film of chromium-silicon monoxide.

3. A process as in claim 1 wherein the substrate to be coated is of silicon.

4. A process as in claim 1 wherein the substrate to be coated is made of an appropriately dielectric insulated molybdenum.

5. The process of claim 1 wherein said pellets fed to said pellet evaporator consist essentially of a solid mixture of a plurality of silicon monoxide powder particles and a plurality of chromium powder particles in one body, said silicon monoxide powder particles and said chromium powder particles being present at an atomic ratio within the range of from 90:10 to 70:30.

6. The process of claim 5 wherein said mixture is a solid homogeneous mixture of said silicon monoxide powder and said chromium powder.

7. A process for producing thin film chromium-silicon monoxide resistors comprising:

(a) admixing chromium and silicon monoxide powder at an atomic ratio of Cr:SiO within the range of from about 90:10 to about 50:50, said atomic ratio being substantially equivalent to the desired composition of said resistor film, (b) forming the powder into a pellet, (c) sequentially feeding a plurality of said pellets into a pellet evaporator, and (d) simultaneously evaporating a plurality of pellets by contacting a plurality of said pellets with a heated filament to produce a vapor of substantially constant composition, whereby a homogeneous, highly accurate compositional resistor film deposit of chromium-silicon monoxide on a substrate provided in said pellet evaporator results.

8. The process of claim 7 wherein the silicon monoxide and chromium powder are mixed at an atomic ratio within the range of from about 90:10 to about 70:30, respectively.

9. The process of claim 7 wherein said pellets fed to said pellet evaporator consist essentially of a solid mixture of a plurality of silicon monoxide powder particles and a plurality of chromium powder particles in one body, said silicon monoxide powder particles and said chromium powder particles being present at an atomic ratio within the range of from 90:10 to 70:30.

10. The process of claim 7 wherein said mixture is a solid homogeneous mixture of said silicon monoxide powder and said chromium powder.

11. A process for reproducibly producing thin film chromium-silicon monoxide resistors having highly accurate compositions comprising:

(a) admixing chromium and silicon monoxide powder at an atomic ratio of Cr:SiO within the range of from about 90:10 to about 50:50, said atomic ratio being substantially equivalent to the desired composition of said resistor film, (b) adding thereto a temporary mixture which is substantially completely removable by the application of heat thereto, said temporary mixture comprising an organic solvent, a binder, a plasticizer, and a wetting agent, (c) homogenizing said powder-temporary mixture thus formed in a ball mill, (d) preparing cermet sheets from the thus homogenized mixture by a wet film applicator and casting knife, (e) cutting said cermet sheets into pellets, (f) heating and drying said pellets and sintering said pellets, whereby said temporary mixture is substantially completely removed, and (g) feeding the resulting pellets to a powder evaporator and simultaneously evaporating a plurality of pellets by contacting a plurality of said pellets with a heated filament to produce a vapor of substantially constant composition, whereby a homogeneous, highly accurate compositional resistor film deposit of chromium-silicon monoxide on a substrate provided in said pellet evaporator results.

12. The process of claim 11 wherein said pellets are substantially completely evaporated.

13. The process of claim 11 wherein said pellets are small cubes about 0.030 inch in edge dimension and said powders have a particle size of less than 20 microns.

14. The process of claim 11 wherein said pellets fed to said pellet evaporator consist essentially of a solid mixture of a plurality of silicon monoxide powder particles and a plurality of chromium powder particles in one body, said silicon monoxide powder particles and said chromium powder particles being present at an atomic ratio within the range of from 90:10 to 70:30.

15. The process of claim 11 wherein said mixture is a solid homogeneous mixture of said silicon monoxide powder and said chromium powder.

16. A process for producing a thin film chromium-silicon monoxide resistor comprising:

(a) admixing a predetermined ratio of chromium and silicon monoxide powder at an atomic ratio of Cr:SiO within the range of from about 90:10 to 70:30, respectively, said atomic ratio being substantially equivalent to the desired composition of said resistor film, (b) adding thereto a temporary mixture substantially complete removable by heating which comprises organic solvents, a binder, a plasticizer and a wetting agent, (c) homogenizing the product from step (c) in a ball mill, (d) preparing cermet sheets from said homogeneous mixture by a wet film applicator and a casting knife, (e) drying and cutting up said sheets into small cubes, (f) treating said small cubes in a furnace at elevated temperatures to remove the temporary mixture and results in pellets having a predetermined compositional content, and (g) feeding the resulting pellets to a pellet evaporator and evaporating material from said pellets by the direct application of heat thereto, said evaporated material thereby depositing on an appropriate substrate located in said evaporator to result in a thin film chromium-silicon monoxide resistor.

17. A process as in claim 16 wherein the organic solvents employed are toluene, ethyl alcohol and cyclohexanone; the binder is a polyvinyl butyral resin; and the plasticizer is dibutyl phthalate.

(References on following page)

References Cited

UNITED STATES PATENTS

| | | | |
|---|---|---|---|
| 2,414,792 | 1/1947 | Becker et al. | 264—104 |
| 2,633,521 | 3/1953 | Becker et al. | 264—111 X |
| 3,203,830 | 8/1965 | Ostrander | 117—227 |
| 3,325,258 | 6/1967 | Fottler et al. | 117—107 X |

OTHER REFERENCES

Zimmerman et al.: Handbook of Material Trade Names, 1953, p. 561, relied upon.

Holland: Thin Film Microelectronics, 1965, pp. 149, 153, 154 and 155 relied upon.

Powell et al.: Vapor Deposition, May 10, 1966, pp. 271–272 relied upon.

Shang: IBM Technical Disclosure Bulletin, vol. 9, No. 6, November 1966, p. 575 relied upon.

ALFRED L. LEAVITT, Primary Examiner

A. GRIMALDI, Assistant Examiner

U.S. Cl. X.R.

117—4, 106, 107, 227, 229; 264—104, 111, 118, 122, 128